United States Patent [19]
Noritake et al.

[11] Patent Number: 5,282,733
[45] Date of Patent: Feb. 1, 1994

[54] INJECTION MOLDING MACHINE HAVING EXCHANGEABLE SUB-MOLDS

[75] Inventors: Hiroshi Noritake; Takeo Murayama; Hideo Onda; Satoru Yoshizawa; Kazuhiko Kogo, all of Tokyo, Japan

[73] Assignee: Seikosha Co., Ltd., Tokyo, Japan

[21] Appl. No.: 812,782

[22] Filed: Dec. 23, 1991

[51] Int. Cl.⁵ .............................. B29C 45/10
[52] U.S. Cl. .................. 425/183; 425/190; 425/192 R; 425/556; 425/DIG. 33
[58] Field of Search ............ 425/3, 165, 182, 183, 425/185, 186, 190, 192 R, 556, DIG. 33

[56] References Cited

U.S. PATENT DOCUMENTS

| | | |
|---|---|---|
| 3,315,302 | 4/1967 | Phillipson et al. ............ 425/165 |
| 4,911,632 | 3/1990 | Mansfield ..................... 425/186 |
| 5,033,947 | 7/1991 | Zanetos et al. ................ 425/3 |
| 5,122,051 | 6/1992 | Joyner ........................ 425/556 |

FOREIGN PATENT DOCUMENTS

| | | |
|---|---|---|
| 58-42100 | 3/1983 | Japan . |
| 62-99126 | 5/1987 | Japan ........................ 425/190 |

*Primary Examiner*—Tim Heitbrink
*Attorney, Agent, or Firm*—Jordan and Hamburg

[57] ABSTRACT

An injection molding machine includes a sub-mold hollow structure defining a plurality of sub-mold hollows which are formed in at least one of a fixed-side base plate and a movable-side base plate with a keyway being formed in the base plate in which the sub-mold hollow structure is formed. A changeable sub-mold is detachably mounted in each of the sub-mold hollows, and a comb-shaped fixing key is detachably engaged in the keyway and fixes the changeable sub-molds when the comb-like fixing key is inserted into the keyway.

22 Claims, 6 Drawing Sheets

INJECTION MOLDING MACHINE HAVING EXCHANGEABLE SUB-MOLDS

BACKGROUND OF THE INVENTION

When a mold is used in an injection molding machine, a small size mold (sub-mold) is installed into a base mold. In this case, only small size molds are exchanged while a base mold is commonly used, to thereby match the mold with various kinds of products having different shapes. This enables a manufacturing cost for the mold to be reduced.

Conventionally, a rotary fastening mechanism, a clamp mechanism, etc. have been used to install the small size mold. Besides, according to Japanese Laid-Open Patent Publication of No. Sho-58-42100, a mold plate loaded with the sub-mold is pulled out of a support frame for the mold plate to exchange the sub-mold.

However, in the case of installing the sub-mold with the rotary fastening mechanism, the clamp mechanism, etc., the installation will take a long time, so that the working efficiency of the injection molding is much reduced. Further, since the installation work is more complex, it has been difficult to realize automation for this process.

On the other hand, in the case of exchanging the mold plate, since an exchanging operation is carried out while every mold plate loaded with the sub-mold is suspended by a crane or the like and the mold plate is fixed with screws, it is also a time-consuming and complicated task.

Further, a product eject mechanism is supplied when it is difficult to take the product out of a cavity. However, in a conventional manner, only one eject pin penetrating from a base mold through a changeable sub-mold is provided, and the eject pin is moved to the cavity side to perform a product-ejecting operation (for example, as described in Japanese Examined Published Patent Publication of No. Sho-58-42100)

In this manner, the position at which the eject pin is provided is unchangeable, and thus the ejecting operation must be carried out at this position at all times. Therefore, the position of ejection is sometimes unsuitable for the shape of the cavity of the changeable sub-mold, and thus it frequently occurs that the molded products are not completely ejected or are damaged.

In order to obtain an optimum position for the ejection, it is necessary to reform the base molds. The reforming of the base molds will result in an obstacle to the requirement for reducing the manufacturing cost of the mold. The result turns out contrary to the expectation of decreasing cost.

SUMMARY OF THE INVENTION

An object of this invention is to provide an injection molding machine in which the installation of a changeable sub-mold can be simply carried out.

Another object of this invention is to provide an injection molding machine in which the mold manufacturing cost can be reduced and the optimum ejecting position of a product can be obtained.

In order to attain the above objects, according to this invention, an injection molding machine comprises a number of sub-mold hollows which are formed in at least one of a fixed-side base plate and a movable-side base plate along a thickness direction thereof, a key way formed in a surface direction on the base plate in which the sub-mold hollows are formed, a changeable sub-mold which is detachably mounted in each of the sub-mold hollows, and a comb-shaped fixing key which is detachably engaged with the key way and fixes the changeable sub-mold by engaging with an engaging portion of the changeable sub-mold when inserted into the key way.

Further, an injection molding machine according to this invention comprises a changeable sub-mold which is detachably mounted in a movable-side mold, a first eject mechanism provided for the changeable sub-mold, and a second eject mechanism provided for the movable-side mold for actuating the first eject mechanism.

Preferred embodiments of this invention will be described in more detail with reference of the accompanying drawings.

DESCRIPTION OF THE PREFERRED EMBODIMENTS

Figure 1:
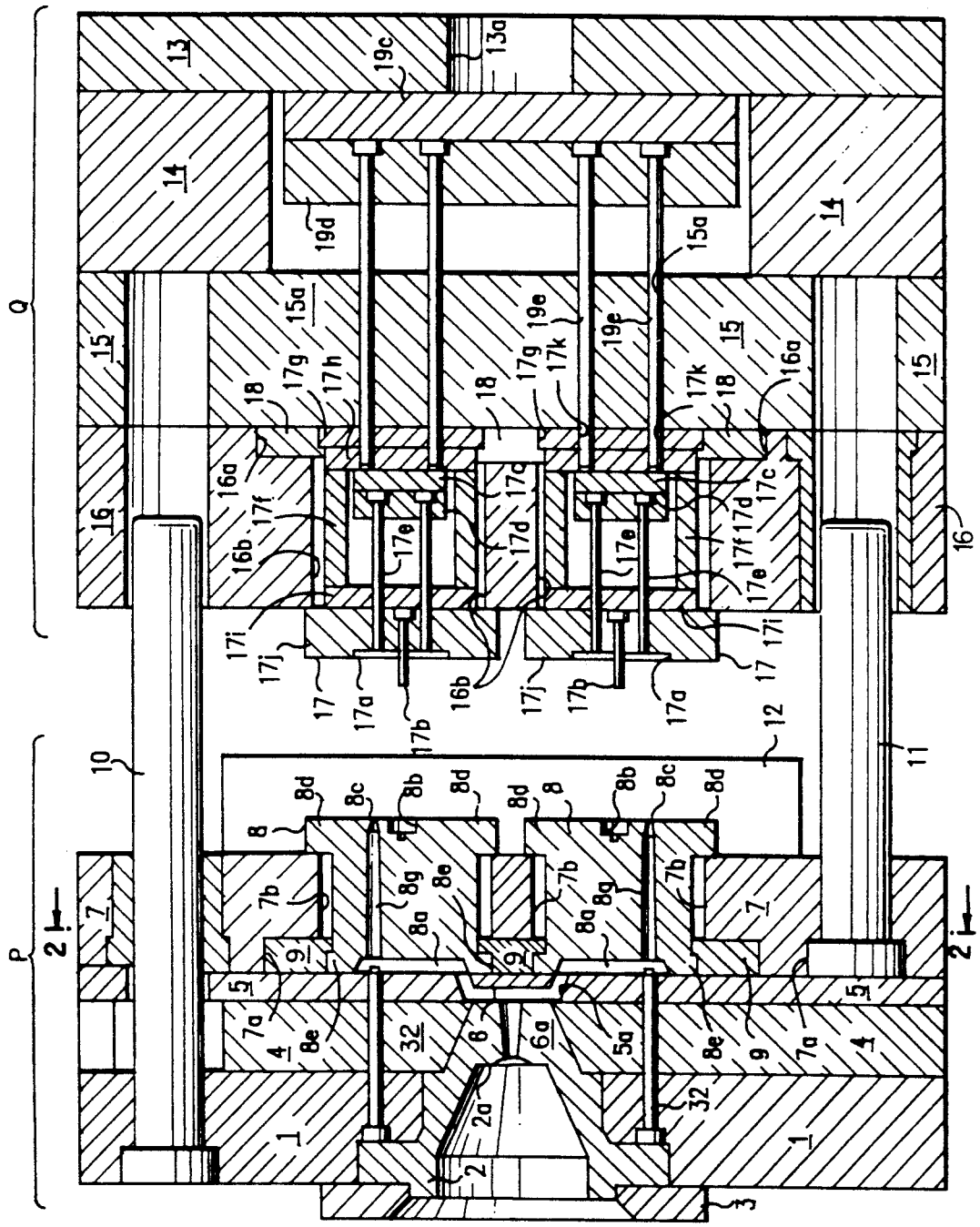
FIG. 1 is a cross-sectional view of an injection molding machine according to this invention which is taken at various positions.

A mold comprising a fixed-side mold P and a movable-side mold Q is shown in FIG. 1.

The fixed-side mold P will be described first.

Figure 2:
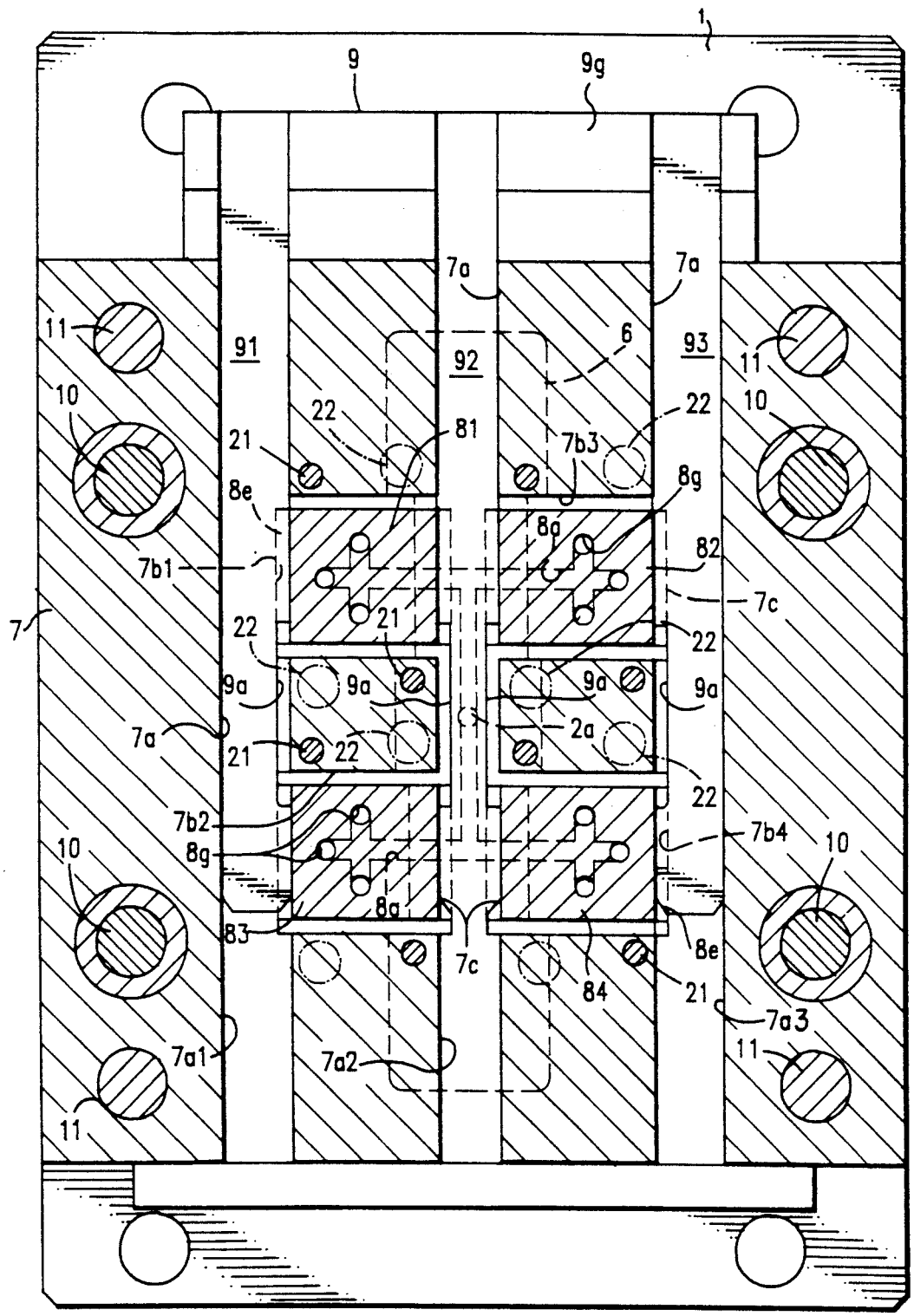
FIG. 2 is a longitudinal-sectional view which is taken along 2—2 line in FIG. 1.

A nozzle bushing 2 having a sprue 2a is secured to a fixed-side securing plate 1 through a locating ring 3. A nozzle (not shown) of an injection molding machine is engaged with the nozzle bushing 2, and four support shafts 10 are fixedly secured onto the fixed-side securing plate 1 as well as shown in FIG. 2. Moreover, a runner lock pin 32 having an under-cut shaped tip portion which reaches a runner portion 8a as described later is also provided on the fixed-side securing plate 1.

A spacer plate 5 having a hollow 5a in which a runner plate 6 as described later is insertably mounted is secured onto a receiving plate 4.

A fixed-side base plate 7 is disposed on the right side of the spacer plate 5 as shown FIG. 1 in such a manner as to be freely slidably supported by the support shafts 10. Four sub-mold hollows 7b which are cut out in the fixed-side base plate 7 in the direction of the thickness of the fixed-side plate 7 so as to have the same rectangular cross-sectional shape, are arranged at a predetermined interval at two stages in the up-and-down direction and in two rows in the left-and-right direction in FIG. 2. For the convenience of description, the sub-mold hollow at the upper left side in FIG. 2 is represented by 7b1, and likewise the sub-mold hollows at the lower left side, at the upper right side and at the lower right side in FIG. 2 are represented by 7b2, 7b3, 7b4, respectively.

Figure 4:
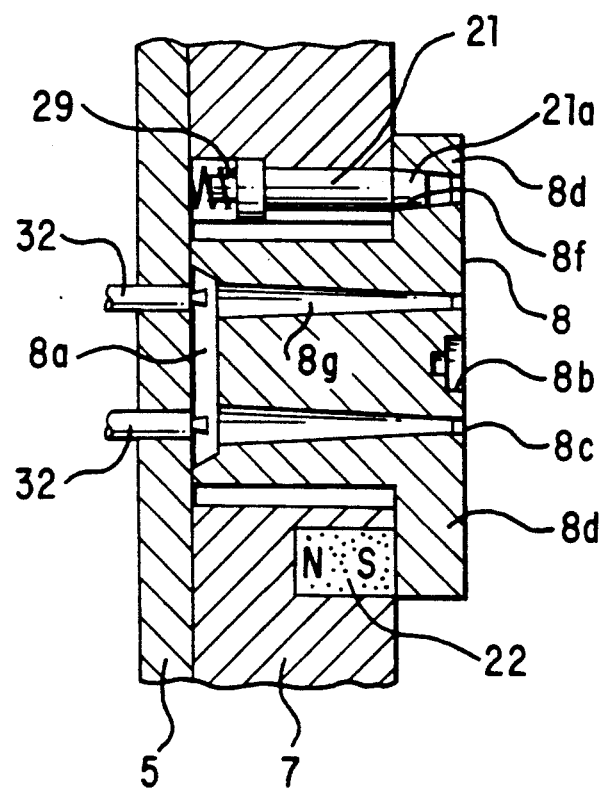
FIG. 4 is a longitudinal-sectional view showing a mechanism for positioning a changeable sub-mold and to prevent it from falling off.

A centering pin 21 is provided at the upper left side and lower right side of each sub-mold hollow 7b on the fixed-side base plate 7 as shown in FIG. 2. Each centering pin 21 is freely movably engaged on the fixed-side base plate 7 so as to be protectable from the fixed-side base plate 7, and is urged from the back side thereof by a press spring 29 as shown in FIG. 4. The tip portion 21a (FIG. 4) of each centering pin 21 has a tapered configuration.

The positioning of the fixed-side sub-mold 8 is performed through engagement of a front flange 8d of the fixed-side changeable sub-mold 8 with the centering pin 21. In addition, a permanent magnet 22 is embedded into the fixed-side base plate 7 at the upper right side and at the lower left side of each sub-mold hollow 7b as shown in FIG. 2, and the permanent magnets 22 are brought into contact with the front flange 8d of the fixed-side changeable sub-mold 8 as shown in FIG. 4.

Three key ways each having a substantially rectangular cross-sectional shape 7a are formed at upper and lower portions in the surface direction on the back surface of the fixed-side base plate 7. For the convenience of description, the key way at the left side of FIG. 2 is represented by 7a1, and the key ways at the middle position and at the right side of FIG. 2 are represented by 7a2 and 7a3, respectively. As shown in FIG. 1 and FIG. 2, each key way 7a is designed so as to be partly overlapped with the sub-mold hollows 7b at the upper and lower sides, and especially the key way 7a2 is overlapped with all of the sub-mold hollows 7b at the overlapping region 7c. A key for securing (a securing key) 9 fixedly engages with a rear flange 8e of the changeable sub-mold 8 as described later.

On the fixed-side base plate 7 are fixedly mounted four guide shafts 11 for guiding a movable-side base plate 16. Further, the spacers 12 are fixedly secured to the upper and lower ends of the fixed-side base plate 7, whereby when a mold closing of the fixed-side and movable-side molds is carried out, the spacers 12 will be brought into contact with the movable-side base plate to prevent an excessive force from occurring between the fixed-side changeable sub-mold 8 and the movable-side changeable sub-mold 17. In addition, the fixed-side base plate 7 is connected to the movable-side mold Q through a limiting bolt (not shown in the drawings). When the movable-side mold Q is moved away from the fixed-side mold P over a predetermined distance, the fixed-side base plate 7 will follow the movement of movable-side mold Q through the limiting bolt, and will be moved away from the spacer plate 5.

Figure 3:
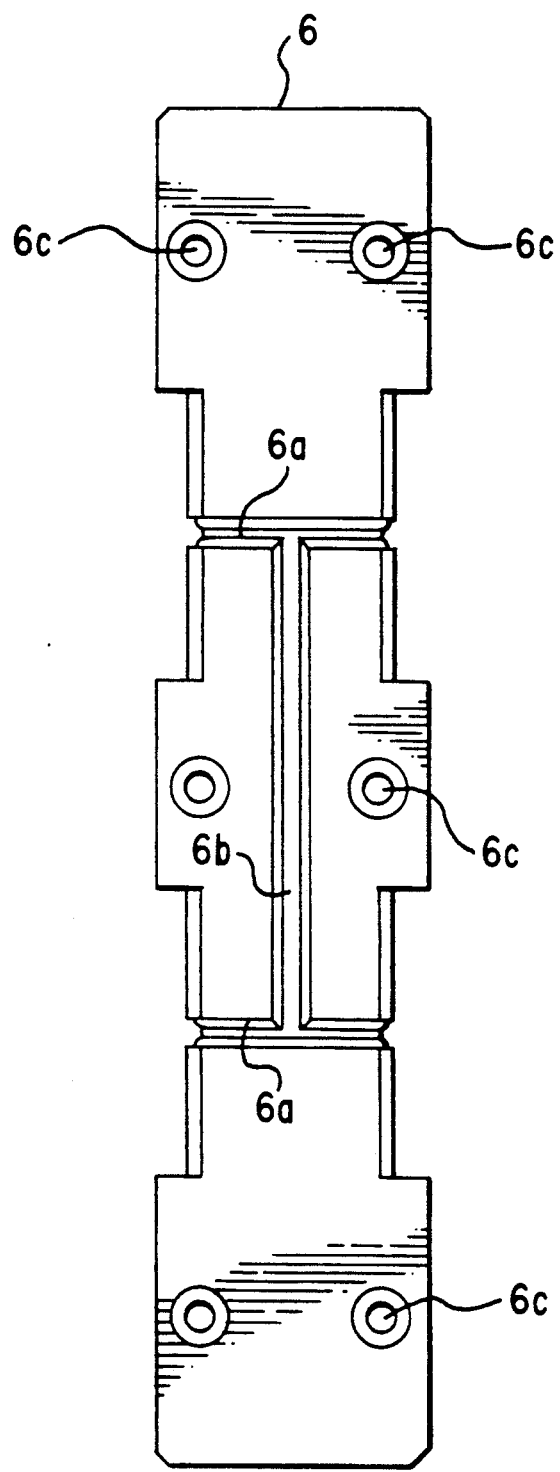
FIG. 3 is a front view of a runner plate.

The runner plate 6 is fixedly secured onto a center portion of the back surface of the fixed-side base plate 7, disposed so as to be overlapped with all of the four sub-mold hollows 7b as shown in FIG. 2. FIG. 3 is a front view showing the runner plate 6 which is viewed from the left side in FIG. 1. The runner plate 6 is formed with a longitudinal runner 6b having a predetermined length in up-and-down direction and lateral runners 6a extending from both ends of the longitudinal runner 6b in the left-and-right direction. The runner plate 6 has substantially the same thickness as the spacer plate 5, and is fixedly secured onto the fixed-side base plate 7 by screws through fitting holes 6c. In the case where melted material is injected from the sprue 2a located in the center position of the apparatus to gates 8c, since the runner plate 6 is disposed in such a manner that it is overlapped with the sub-molds hollows 7b and the melted materials flows over the runner plates 6, the runner plate 6 is overlapped with the changeable sub-mold 8 and thus the melted material can be prevented from entering gaps between the sub-mold hollows 7b and the changeable sub-mold 8.

The fixed-side changeable sub-mold 8 includes the front flange 8d and the rear flange 8e. As shown in FIG. 1, the front flange 8d is engagedly supported on the front surface of the fixed-side base plate 7 while the rear flange 8e is engagedly supported by the securing key 9 which is inserted into the key ways 7a, so that the fixed-side changeable sub-mold 8 is fixedly installed into the base plate 7. For the convenience of description, the changeable sub-molds 8 which are inserted into and pulled out of the sub-molds hollows 7b1, 7b2, 7b3, and 7b4 are represented by 81, 82, 83, and 83, respectively. As shown in FIG. 4, the front flange portion 8d is also formed in the upper and lower portions, and a centering hole 8f is formed on the front flange 8d in such a position as to be confronted with the centering pin 21 when the fixed-side changeable sub-mold 8 is installed into the fixed-side base plate 7. A cavity 8b is formed in the front surface of the fixed-side changeable sub-mold 8, and is combined with a cavity 17a of the moveble-side changeable sub-mold 17 to form a molded product. A runner 8a is formed on the back surface of the fixed-side changeable sub-mold 8, still further, three runners 8g are formed so as to extend from the ends of the runners 8a to the front surface of the fixed-side changeable sub-mold 8 as shown in FIG. 2, and the tips of the runners 8g serve as gates 8c.

The fixed-side securing key 9 will be next described.

The securing key (the key for securing) 9 is constructed with a comb-shaped configuration by connecting the three keys 91, 92, and 93 insertable into the key ways 7a1, 7a2, and 7a3 at the upper portions thereof with a connecting member 9g as shown in FIG. 2. Each of the keys 91, 92, and 93 is formed with a flange portion at the engaging side of the key with the changeable sub-mold 8 as shown in FIG. 1, and the flange portion serves to engagedly support the rear flange 8e of the fixed-side changeable sub-mold 8. Further, the keys 91, 92, and 93 are formed with cutout portions 9a at the same height position at the engaging side of the mold 8. The length of each cutout groove is slightly longer than the longitudinal (up-and-down) length of the changeable sub-molds 81, 82, and the width of the cutout portion 9a is set such that when the cutout portion 9a is located at the position of the changeable sub-molds 81, 82, it will release the engagement of the rear flange 8e with the keys 91, 92, and 93. Further, since the length of the fixing portion at the tip portion of each key 91, 92, 93 which serves to fix the changeable sub-molds 83, 84 is set to be shorter than the gap interval between the upper and lower changeable sub-molds 81 and 83 or the gap interval between the upper and lower changeable sub-molds 82 and 84. Therefore, when the securing key 9 is moved by a certain distance, the fixing portion for the changeable sub-molds 83, 84 will be moved to the gap interval between the upper and lower changeable sub-molds 81 and 83 or to the gap interval between the upper and lower changeable sub-molds 82 and 84, and in addition the cutout portion 9a is moved to the position of the changeable sub-molds 81, 82, so that the engagement between the changeable sub-molds 81, 82, 83, and 84 and the keys 91, 92, and 93 is released.

The movable-side mold Q will be next described.

In FIG. 1, the movable-side securing plate 13 is installed onto a movable member (not shown) of the injection molding machine and is movable forwards and backwards to and from the fixed-side mold P.

A spacer block 14, a receiving plate 15 and a movable-side base plate 16 are fixedly secured to the securing plate 13.

Like the base plate 7 of the fixed-side mold P, four sub-mold hollows 16b are formed along its thickness direction on the movable-side base plate 16. In addition, on the movable-side base plate 16 two centering pins are diagonally installed in upper and lower positions of each hollow 16b (not shown). The structure of the centering pin is identical to that of the centering pin 21 of the fixed-side mold P. Further, like the fixed-side mold P, in the movable-side base plate 16, permanent magnets are diagonally embedded at the upper and lower positions of each hollow 16 which correspond to counter positions to those of the above centering pins (not shown).

On the back surface of the movable-side base plate 16, like the fixed-side mold P; three key ways each having substantially rectangular cross-sectional shape 16a are formed in the up-and-down direction.

The movable-side changeable sub-mold is constructed by fixedly securing a bottom plate 17g, a receiving plate 17h, a spacer plate 17f, a first mold plate 17i, and a second mold plate 17j to one another in this order. The bottom plate 17g is longer in the right-and-left direction relatively to the receiving plate 17h, and this longer part serves as the rear flange. Further, the second mold plate 17j is longer in the left-and-right and up-and-down directions relatively to the bottom plate 17g and so on, and this longer part serves as the front flange. In addition, the centering hole is formed at such a position as to be confronted with the above centering pin (not shown).

A cavity 17a is formed on the front surface of the second mold plate 17j, and a core pin 17b is also secured thereto.

Figure 5:
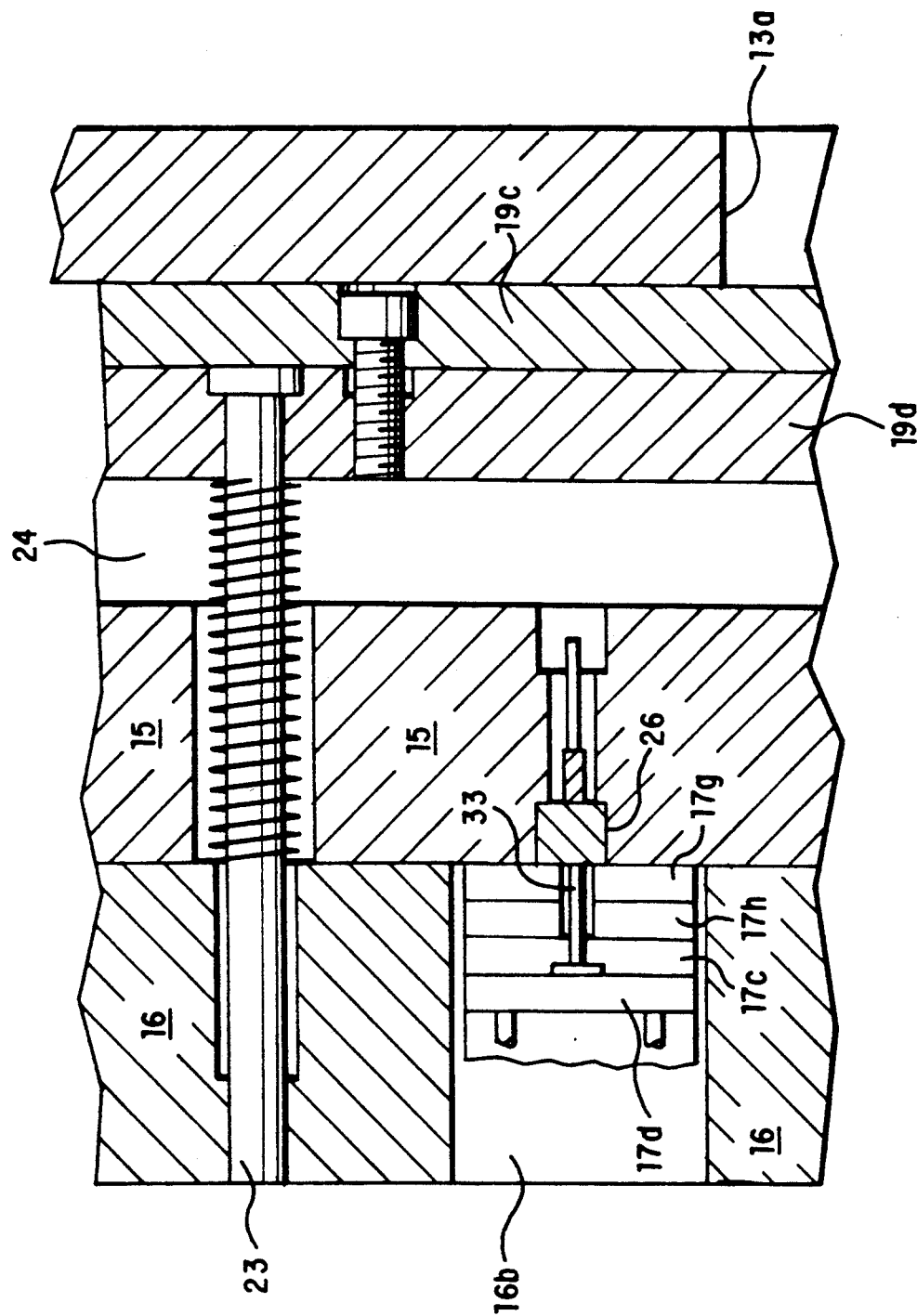
FIG. 5 is a cross-sectional view showing a receding mechanism of the second eject mechanism and a detection mechanism for detecting the receding movement of the first eject mechanism.

A first eject mechanism for the product is provided on the movable-side changeable sub-mold 17. The first eject mechanism has a structure in that first eject plates 17c, 17d and first pins 17e which are fixed on the first eject plates 17d are placed within a space formed in the spacer plate 17f, and the first eject pins 17e are freely slidably moved along through holes connecting the space and the cavity 17a. Further, a return spring comprising a compression spring (not shown) is provided between the first eject plate 17d and the first mold plate 17i within the space of the spacer plate 17f, and serves to urge the first eject pins 17e and the first eject plates 17c, 17d in a receding direction thereof. Moreover, the through holes 17k are formed through the bottom plate 17g and the receiving plate 17h at such a position as to be confronted the first eject plate 17c. The eject pin 17e is allowed to go ahead by passing the eject pin 19e of the second eject mechanism as described later through the through hole 17k to press the eject plate 17c. Since the first eject mechanism is provided with an independent construction, it is possible to set the eject pins 17e at the optimum positions in accordance with the shape of the cavity 17a. A sensor pin 33 is fixed on the eject plates 17c and 17d and extends backwards, and as shown in FIG. 5 is designed in such a manner that it extends through a through hole drilled in both of the receiving plate 17h and the bottom plate 17g, such that its tip confronts a detect sensor 26 such as a contactless switch which is provided to the receiving plate 15. When the eject plates 17c and 17d are moved backwardly, the tip of the sensor pin 33 approaches to the detect sensor 26, so that the backward movement of the eject pin 17e is detected.

Like the fixing key 9 of the fixed-side mold P, the movable-side fixing key 18 is also constructed as a comb-shaped one by connecting three keys to one another at their upper ends (not shown). In addition, the same construction as the fixing key of the fixed-side mold P is made for the fixing key 18 in the following points: a flange portion is formed at an engagedly supporting side of the fixing key 18 for the sub-mold 17, the rear flange portion of the sub-mold 17 is engagedly supported by this flange portion, and a cutout portion having predetermined length and width is formed at a predetermined position at the engagedly supporting side of the fixing key 18 for the sub-mold 17.

A second eject mechanism is provided behind the changeable sub-mold 17. The second eject mechanism has the following construction. Second eject plates 19c and 19d and eight second eject pins 19e which are fixed on the second eject plates 19d are placed inside a space formed by a spacer block 14, the receiving plate 15 has through holes 15a corresponding to the through holes 17k of the changeable sub-mold 17, and each pair of the eight eject pins 19e are freely movably inserted into communicating through holes 15a and 17k which are confronted to the corresponding first eject plate 17c of each changeable sub-mold 17.

Further, as shown in FIG. 5, a return pin 23 is fixed in the eject plates 19c, 19d, and a return spring 24 comprising a compression spring is suspended between the eject plate 19d on the return pin 23 and the base plate 16 to urge the eject pin 19e in the receding direction thereof. When an eject rod (not shown) pushes the eject plate 19c through a hole 13a, the eject pins 19e is allowed to be moved forwardly.

The operation of the injection molding machine of this invention will be next described.

In a mold-opened state, fixed-side changeable sub-molds for a desired product 8 are inserted into the fixed-side sub-mold hollows 7b through a PL plane, so that the centering pins 21 are engaged with the centering holes 8f on the front flange 8d of the fixed-side changeable sub-mold 8 and the front flange 8d is attracted by the permanent magnets 22 to prevent the fixed-side changeable sub-mold 8 from falling off. Then, the comb-shaped fixing key 9 is inserted into the key way 7a. In this condition, the flange portion of the fixing key 9 engagedly supports the rear flange portion 8e of the fixed-side changeable sub-mold 8, so that the fixed-side changeable sub-mold is fixedly secured to the fixed-side base plate 7. Since all of the keys 91, 92, and 93 are connected to one another to form the fixing key 9, all of the fixed-side changeable sub-molds 8 can be fixedly secured by carrying out only one inserting operation of the fixing key 9. Like the fixed-side changeable sub-molds 8, the movable-side changeable sub-molds 17 are fixedly secured to the movable-side base plate 16 by putting the movable-side changeable sub-molds 17 in the movable-side sub-mold hollows 16b and inserting the comb-shaped fixing key 18 into the key ways 16b to thereby fixedly secure the movable-side changeable sub-molds to the movable-side base plate 16. After the movable-side changeable sub-molds 17 are inserted into the sub-mold hollows 16b, the second eject pints 19e are inserted into the through holes 17k.

When the molds are closed, the spacer 12 is brought into contact with the movable-side base plate 16, and the PL planes of the fixed-side base plate 7 and the movable-side base plate 16 are closed to thereby form cavities 8b, 17a.

Consequently, pellets which are discharged from a hopper of the injection molding machine are pushed forwards by a screw in a cylinder. Material which has been heated and melted is discharged from a nozzle through the sprue 2a into the runners 6b and 6a of the runner plate 6, passed through the runners 8a and 8g of the fixed-side changeable sub-mold 8 and flows through the gate 8c into the cavities 8b and 17a. As the runner plate 6 is overlapped with the changeable sub-mold 8, the melted material can be prevented from flowing into the gap between the changeable sub-mold 8 and the sub-mold hollow 7b.

After the material within the cavities 8b, 17a has solidified, the PL planes are opened to a predetermined interval, so that the molded material is separated from the gate 8c and remains in the cavity 17a. On the other hand, upon the opening of the PL planes, the eject rod (not shown in Figs.) invades through the hole 13a and pushes the eject plates 19c, 19d and the eject pins 19e of the second eject mechanism, so that the eject plates 19c and 19d and the eject pins 19e are forwardly moved. As a result, the eject plates 17c and 17d and the eject pins 17e are pushed by the eject pins 19e to be moved forwardly, and the product in the cavity 17a is ejected.

After ejection of the product, the PL planes are further opened to a predetermined interval, so that the fixed-side base plate 7 is moved away from the spacer plate 5. Upon this action, the undercut portion at the tip of the runner lock pin 32 is pulled out of the solidified material in the runner portion, so that the solidified material falls off naturally and can be removed.

If the same kind of products are required to be produced, before closing the molds, it is confirmed by the retreat detecting sensor 26 whether the first eject pins 17e of the first eject mechanism are moved backwardly. That is, when the molds are closed, the eject rod (not shown) retreats from the through hole 13 at the same time. In association with this retreating movement of the eject rod, the eject plates 19c, 19d and the eject pins 19e of the second eject mechanism are backwardly moved by the urging force of the return spring 24, and the eject plates 17c, 17d and the eject pins 17e are also moved backwardly to a predetermined position by the urging force of another return spring (not shown). At this time, if the eject pins 17e do not recede to the predetermined position and the molds are closed, the eject pins 17e would collide against the fixed-side changeable sub-mold 8. Especially, if there is provided a slide core or the like in the fixed-side changeable sub-mold 8, the eject pins 17e may be damaged. However, since the receding movement of the eject pins 17e can be confirmed by means of the detect sensor 26, it is possible to protect the eject pins 17e from being damaged. After closing the molds, the injection molding can be carried out with the same process as described above.

In a case of the exchange of the changeable sub-mold, in an open state of the mold, the comb-shaped fixing key 9 is lifted a predetermined distance while the molds remains opened, so that the cutout portion 9a is situated in the upper changeable sub-molds 81 and 82, and the part of the fixing key 9 which serves to engagedly support the lower changeable sub-molds 83 and 84 is positioned in the gap between the upper and lower changeable sub-molds. As a result, all of the changeable sub-molds 81 to 84 are released. However, the fixed-side changeable sub-molds 8 are attracted to the base plate 7 by the permanent magnets 22, and thus they are prevented from falling down. Therefore, these fixed-side changeable sub-molds are taken out from the PL plane side. Thereafter, new changeable sub-molds 8 are inserted into the sub-mold hollows 7b and fixed by the fixing key 9 in the same manner as described above. The movable-side changeable sub-molds 17 can be exchanged in the same procedure as used for the fixed-side changeable sub-molds. Since the exchange of the changeable molds 8 and 17 can be carried out by slightly sliding the fixing keys 9 and 18, the time for the exchanging operation can be greatly shortened. In addition, if the first eject pins 17e are set at the optimum position in accordance with the shape of the cavity when the movable-side changeable sub-molds 17 are exchanged, with a simple construction in which it is not necessary to change the position of the second eject pins 19e, the products can be pushed at the proper position and be taken out.

After the exchange of the changeable sub-molds is completed, the injection molding can be carried out again in the same manner as described above.

Other preferred embodiments of the centering portion will be next described.

Figure 6:
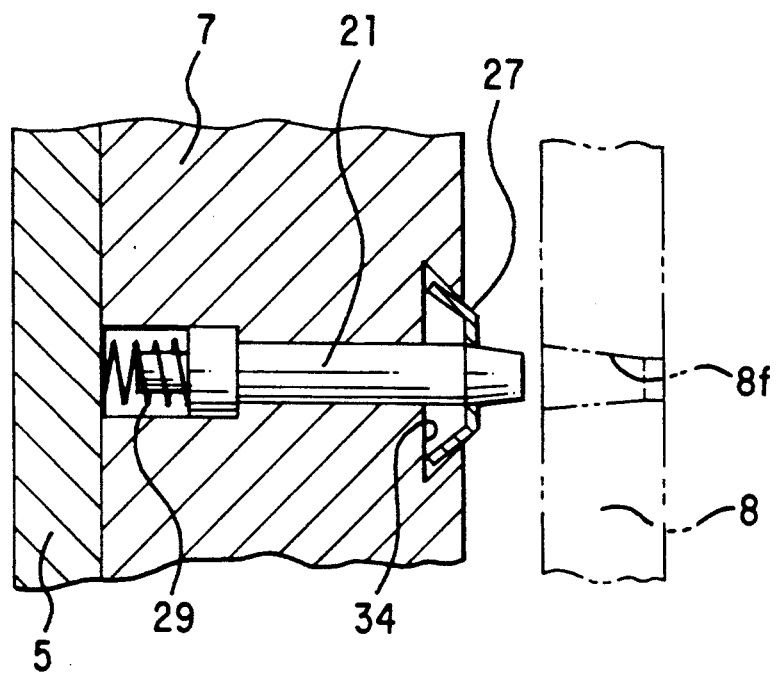
FIG. 6 is a cross-sectional view of another embodiment showing a separating mechanism to separate the centering pin from the centering hole.

In FIG. 6, a hole of truncated cone shape is formed at a surface portion of the base plate 7 in which the centering pin 21 is projectably provided, in such a manner as to surround the centering pin 21. A plate spring 27 is provided in the truncated-cone hole 34 which is projected from the surface of the fixed-side base plate 7 in a free state and embedded into the hole 34 in a state where it is compressed by an external force. Therefore, the plate spring 27 can press from the side of the fixed-side base plate 7 the peripheral portion of the centering hole 8f of the fixed-side changeable sub-mold 8 which is engaged with the centering pin 21. There frequently occurs a great adhesive force between the fixed-side changeable sub-mold 8 and the fixed-side base plate 7 due to oil which adheres onto both surfaces thereof and it is often difficult to remove the fixed-side changeable sub-mold in the exchange operation. However, the plate spring 27 enables the centering pin 21 to be easily pulled out of the centering hole 8f, and thus the removable of the changeable sub-mold 8 can be easily performed. Further, in a case where plural centering pins 21 and centering holes 8f are provided at several places, if the changeable sub-mold 8 is not homogeneously pulled out relatively to the centering pins 21, it is impossible to remove the changeable sub-mold 8 because the changeable sub-mold 8 is deviated. However, the plate spring 27 enables the changeable sub-molds 8 to be homogeneously pushed out from the centering pins 21, and thus the changeable sub-molds can be moved away from each other while no unsuitable force acts on the changeable sub-molds 8 and 17. If a spring force of the plate springs 27 is less than the attracting force of the permanent magnets 22, the changeable sub-molds 8 can be kept attracted on the surface of the fixed-side base plate 7.

Further, the spring force of the plate spring may be larger than the attracting force of the permanent magnet. In this situation, after the fixing key 9 is pulled out, the plate springs 27 overcome the attracting force of the permanent magnets 22 and thus jack up the changeable sub-mold 8 off the surface of the fixed-side base plate 7 to make the exchange of the changeable sub-mold 8 easier. Although the fixed-side changeable sub-molds 8 is buoyed from the surface of the fixed-side base plate 7 by the spring force of the plate springs 27, the attracting force of the permanent magnets 22 to the fixed-side changeable sub-molds 8 still remains, and thus the fixed-side changeable sub-molds 8 is prevented from being further moved away from the fixed-side base plate 7 and falling off. All of the above description is based on that the plate spring 27 is provided to the fixed-side base plate. However, the plate springs 27 may be provided to the changeable sub-mold 8. The above embodiment is also applicable to the movable-side. In place of the plate spring 27, any means capable of generating a predetermined press force such as a compress spring may be used as a member having a separating capability can also be used in this invention.

According to this invention, the changeable sub-mold is installed and removed through the PL plane side, and the fixing of the changeable sub-mold is carried out by the fixing key which is inserted and pulled out along the surface direction of the base plate, so that the exchange work of the changeable sub-mold is very simple and can be automatically and remarkably easily done by a robot or the like.

According to this invention, the changeable sub-mold is installed and removed through the PL plane side, and the fixing of the changeable sub-mold is carried out by the comb-shaped fixing key which is inserted and pulled out along the surface direction of the base plate, so that the installing operation of the changeable sub-mold is carried out very simple and in a short time.

Further, according to this invention, the eject mechanism is divided into the first eject mechanism which is provided in the changeable sub-mold and the second eject mechanism which is provided in the movable-side mold, and the first eject mechanism is actuated by the second eject mechanism. Therefore, when the changeable sub-mold is designed, the ejecting position of the first eject mechanism can be set to the optimum position, and thus the reduction in manufacturing cost of the mold and the assurance of the optimum ejecting position can be achieved.

What is claimed is:

1. An injection molding apparatus comprising:
   a fixed-side mold having a fixed-side base plate;
   a movable-side mold having a movable-side base plate and movable between a mold-opened position and a mold-closed position;
   sub-mold hollow means defining a plurality of sub-mold hollows which are formed in at least one of said fixed-side base plate and said movable-side base plate;
   keyways formed in said base plate in which said sub-mold hollow means are formed;
   changeable sub-molds insertable in said sub-mold hollows of said sub-mold hollow means when said movable-side mold is in said mold-opened position through a space between said fixed-side mold and said movable-side mold, said changeable sub-molds being non-rotatably disposed in said sub-mold hollows, each of said changeable sub-molds being detachable from said sub-mold hollows when said moveable side mold is in said opened position through said space between said two molds; and
   comb-shaped fixing key means detachably engaged in said keyways and which fix said changeable sub-molds in said sub-mold hollows by engaging an engaging portion of said changeable sub-molds when said comb-shaped fixing key means has been inserted into said keyways.

2. An injection molding machine comprising:
   sub-mold hollow means defining a plurality of sub-mold hollows which are formed in at least one of a fixed-side base plate and a movable-side base plate;
   a keyway formed in said base plate in which said sub-mold hollow means are formed;
   a changeable sub-mold detachably mounted in each of said sub-mold hollows of said sub-mold hollow means, said changeable sub-molds being removable from each of said sub-mold hollows by moving each changeable sub-mold relative to the respective sub-mold hollow in a generally linear direction,
   a fixing key means movably mounted in said keyway between a locking position and a release position, said key means having engageable means engaging an engaging section of said changeable sub-mold when said key means is in said lock position to prevent said changeable sub-mold from being moved in said linear direction such that said key means thereby retains said changeable sub-mold in said sub-mold hollow means, said key means being movable to its release position in which said engageable means is disengaged from said changeable sub-mold to thereby enable said changeable sub-mold to be removed from said sub-mold hollow means by moving said changeable sub-mold in said linear direction.

3. An injection molding machine according to claim 2, wherein said key means has a plurality of elongated key parts which have parallel longitudinal axes, said plurality of changeable sub-mold means being arranged in a linear direction parallel to said axes of said key parts, and wherein said key means is formed with a cutout portion for releasing the engagement between said key means and said engaging portion of said changeable sub-molds when said key means is slid a certain distance parallel to said axes.

4. An injection molding machine according to claim 2, wherein a runner plate formed with runners is fixedly secured onto a back surface of said fixed-side base plate, said runner plate overlapping several of said changeable sub-molds, said runner plate having runners and said changeable sub-molds having runners which communicate with each other where said runner plate overlaps said changeable sub-molds.

5. An injection molding machine according to claim 2, wherein said sub-molds are provided with a flange portion contacting said base plate at a peripheral portion of each of said sub-mold hollows, and a permanent magnet on said base plate at a position where said flange portion contacts said base plate.

6. An injection molding machine according to claim 2, wherein said sub-molds are provided with a flange portion contacting said base plate at a peripheral portion of each of said sub-mold hollows, and a permanent magnet on said changeable sub-molds where said flange portion contacts said base plate.

7. An injection molding machine according to claim 2, wherein said changeable sub-molds are provided with a confronting surface which confronts a confronting surface of said base plate, and a permanent magnet in one of said confronting surfaces which confronts the other confronting surface.

8. An injection molding machine according to claim 7, wherein said changeable sub-mold has a flange with a flange surface which defines said confronting surface of said changeable sub-mold.

9. An injection molding machine according to claim 7, wherein said changeable sub-mold has a back surface which forms said confronting surface on said changeable sub-mold.

10. An injection molding machine according to claim 2 wherein said changeable sub-molds have a non-circular cross-sectional configuration.

11. An injection molding machine according to claim 2 wherein said changeable sub-molds have a rectangular cross-sectional configuration.

12. An injection molding machine according to claim 2 wherein said changeable sub-molds have a front flange and a rear flange, said front flange being spaced from said rear flange in said linear direction, said front flange abutting said base plate, said rear flange constituting said engaging section of said changeable sub-mold.

13. An injection molding machine according to claim 2 wherein said engaging section of said changeable sub-molds extends along a straight line path.

14. An injection molding machine comprising:
sub-mold hollow means defining a plurality of sub-mold hollows which are formed in at least one of a fixed-side base plate and a movable-side base plate;
a keyway formed in said base plate in which said sub-mold hollow means are formed;
a changeable sub-mold detachably mounted in each of said sub-mold hollows of said sub-mold hollow means;
a comb-shaped fixing key detachably engaged in said keyway and which fixes said changeable sub-molds by engaging an engaging portion of said changeable sub-molds when said comb-shaped fixing key is inserted into said keyway;
said sub-molds being provided with a flange portion contacting said base plate at a peripheral portion of each of said sub-mold hollows, a centering pin on said base plate at a position where said base plate contacts said flange portion, a centering hole in said flange portion of said sub-molds generally aligned with said centering pin, and a spring member providing a separating force urging separation of said centering pin from said centering hole.

15. An injection molding machine according to claim 14, wherein said spring member is a plate spring.

16. An injection molding machine according to claim 14, wherein said plate spring has at least a partial frusto-conical configuration.

17. An injection molding machine comprising:
sub-mold hollow means defining a plurality of sub-mold hollows which are formed in at least one of a fixed-side base plate and a movable-side base plate;
a keyway formed in said base plate in which said sub-mold hollow means are formed;
a changeable sub-mold detachably mounted in each of said sub-mold hollows of said sub-mold hollow means;
a comb-shaped fixing key detachably engaged in said keyway and which fixes said changeable sub-molds by engaging an engaging portion of said changeable sub-molds when said comb-shaped fixing key is inserted into said keyway;
sub-molds being provided with a flange portion contacting with said base plate at a peripheral portion of said sub-mold hollows, a centering pin on said changeable sub-mold at a position where said flange portion of said sub-mold contacts said base plate, a centering hole in said base plate generally aligned with said centering pin, and a spring providing a separating force urging separation of said centering pin from said centering hole.

18. An injection molding machine comprising:
sub-mold hollow means defining a plurality of sub-mold hollows which are formed in at least one of a fixed-side base plate and a movable-side base plate;
a keyway formed in said base plate in which said sub-mold hollow means are formed;
a changeable sub-mold detachably mounted in each of said sub-mold hollows of said sub-mold hollow means;
a comb-shaped fixing key detachably engaged in said keyway and which fixes said changeable sub-molds by engaging an engaging portion of said changeable sub-molds when said comb-shaped fixing key is inserted into said keyway;
said changeable sub-mold being provided with a confronting surface which confronts a confronting surface of said base plate, a centering pin extending from one of said confronting surfaces, a centering hole in the other of sid confronting surfaces generally aligned with said centering pin, and a spring member providing a separating force urging separation of said centering pin from said centering hole.

19. An injection molding machine according to claim 18, wherein said changeable sub-mold has a flange with a flange surface which defines said confronting surface of said changeable sub-mold.

20. An injection molding machine according to claim 18, wherein said changeable sub-mold has a back surface which forms said confronting surface on said changeable sub-mold.

21. An injection molding machine according to claim 18, wherein said spring member is a plate spring.

22. An injection molding machine according to claim 18, wherein said plate spring has at least a partial frusto-conical configuration.

* * * * *